Feb. 28, 1967  I. D. PRESS ET AL  3,306,637
REUSEABLE HOSE END FITTING
Filed Sept. 4, 1964  3 Sheets-Sheet 2

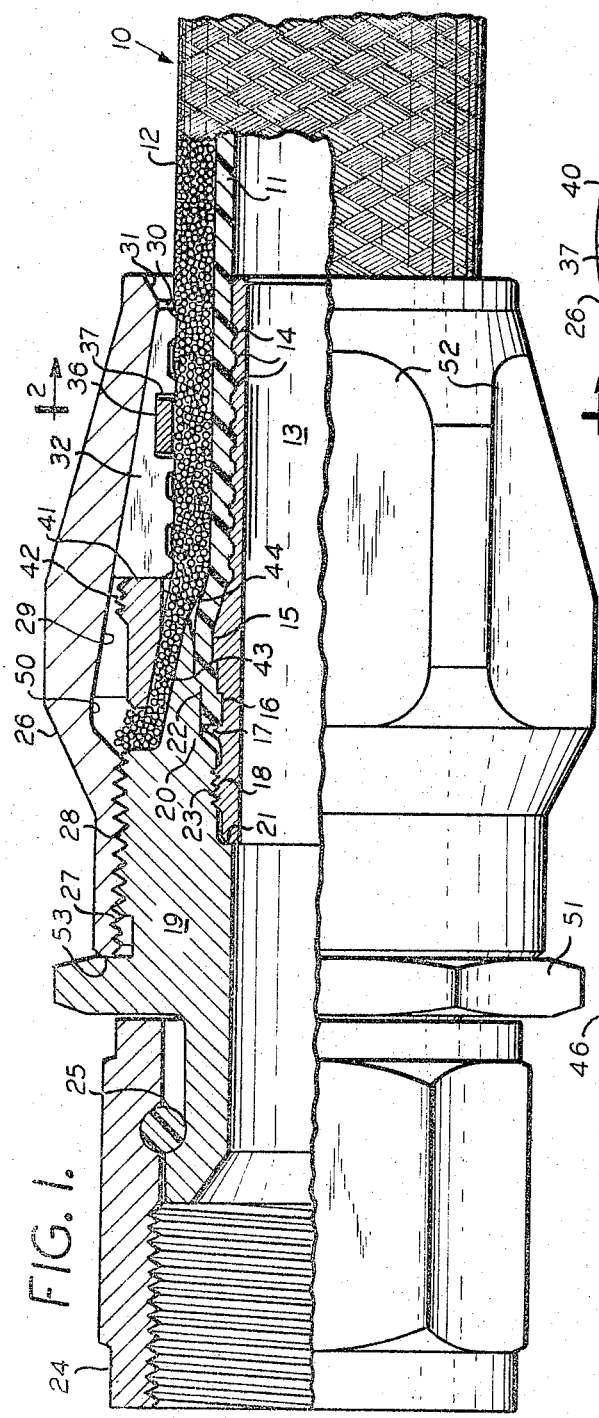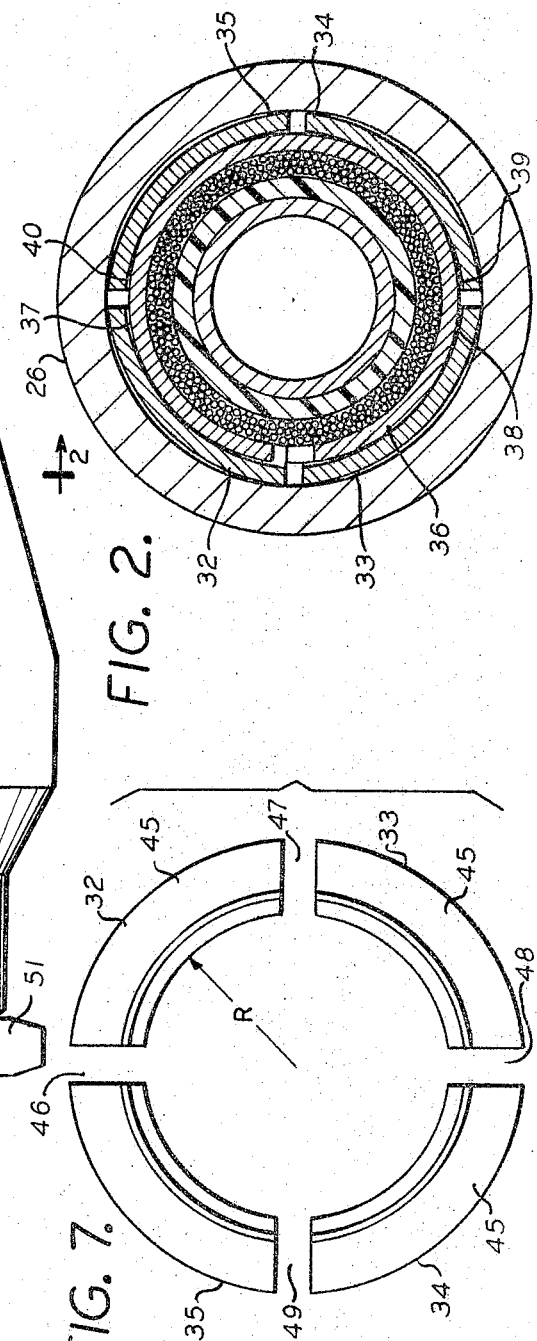

INVENTORS
IRVING D. PRESS
HARVEY R. NICKERSON
BY

Byerly, Townsend, Watson & Churchill
ATTORNEYS.

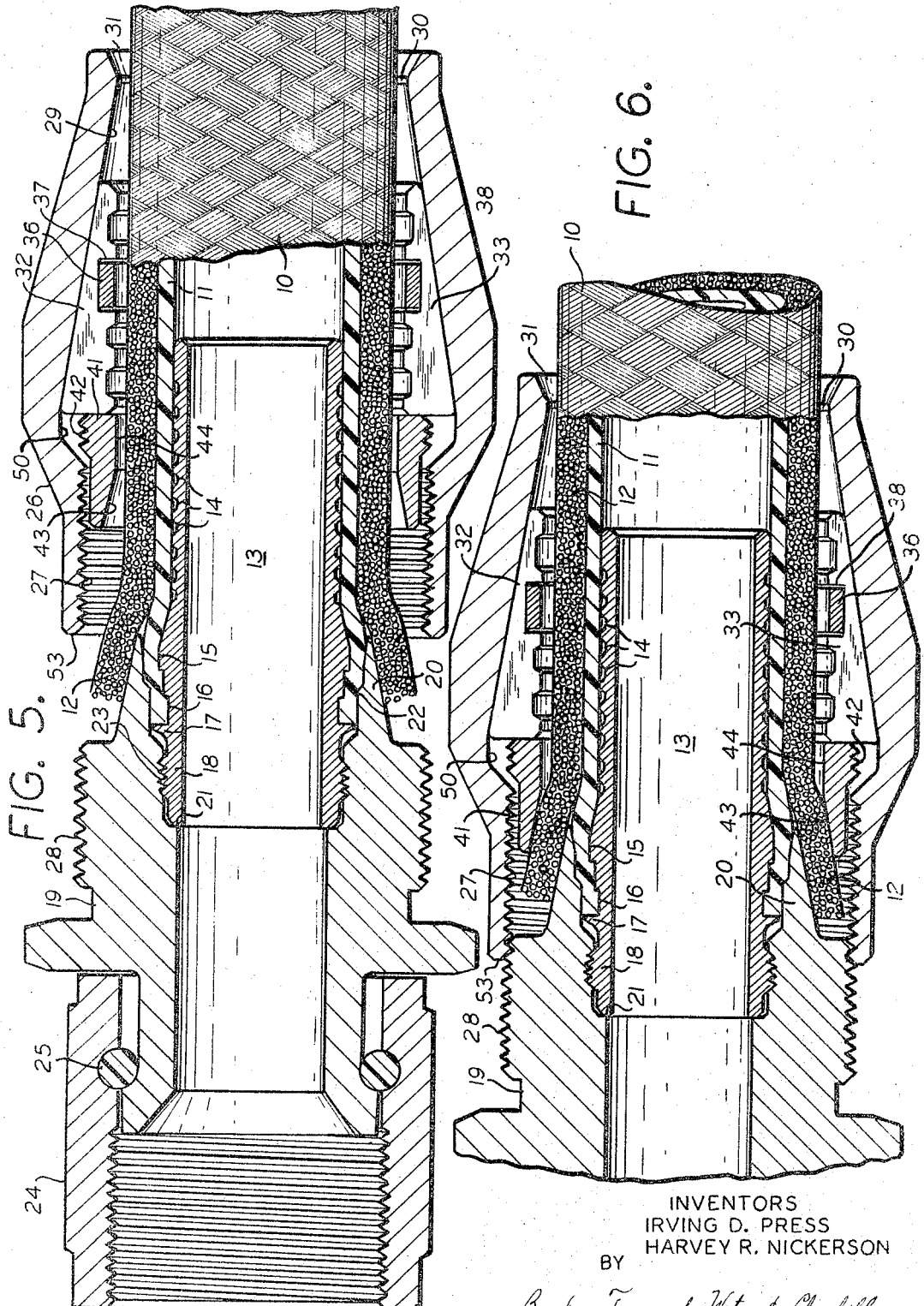

United States Patent Office 3,306,637
Patented Feb. 28, 1967

3,306,637
REUSEABLE HOSE END FITTING
Irving D. Press, West Orange, and Harvey R. Nickerson, Roseland, N.J., assignors to Resistoflex Corporation, Roseland, N.J., a corporation of New York
Filed Sept. 4, 1964, Ser. No. 394,426
4 Claims. (Cl. 285—149)

The present invention relates to a hose end fitting and more particularly to a fitting of the detachable reuseable type.

Generally speaking the aircraft industry has tended to avoid the use of screw together hose end fittings, particularly in critical applications, because of inadequate reliability. Consider the hydraulic hose lines which supply control power for actuating the various flight control surfaces of the craft. A line failure can result in loss of pilot control with attendant disastrous consequences. Numerous incidents involving blow-off failure of screw together fittings have occurred, generally traceable to inadvertent loosening by service mechanics. Hence, if the design of the hose fitting is such that a blow off can be brought about by an unscrewing of the parts, use of the fitting is avoided.

Swaged fittings, because they are believed to be more reliable, are presently preferred for such critical applications. However, special tools are required for their assembly.

Quite often the coupling associated with the hose end fitting represents the principal item of cost in a hose line assembly. For various reasons the hose portions of the assembly are often subject to failure before the expiration of the useful life of the end fitting. It will be appreciated from the foregoing that a great need exists for a detachable hose end fitting which is fully reuseable and which not only gives the impression but is in practice as reliable as a conventional swaged fitting.

The purpose of the present invention is to provide a hose end fitting satisfying the above stated need and which combines the most useful features of both the swaged and screwed together types. In accordance with the invention, a reuseable end fitting is provided for a hose whose wall is divisible into a fluid tight non-metallic interior layer surrounded by a reinforcing layer. The fitting comprises a tubular nipple having one end portion for insertion within the interior layer of the hose and an opposite end portion extending therefrom; a body member in the form of a sleeve having a first end for telescoping over the exposed end portion of the nipple and over the end of the interior layer but under the end of the reinforcing layer, means for securing the sleeve to the exposed end portion of the nipple, and coupling means disposed at the other end of the sleeve; a reaction ring for surrounding the end of the reinforcing layer and clamping it to the first end of the sleeve; contractible annular means for surrounding the reinforcing layer at a point beyond both the reaction ring and the end of the body member but overlying the nipple and having a tapered outer surface; and a socket member having a first end for telescoping engagement with the body member and a second end for surrounding both the contractible means and the reaction ring, said second end of the socket member having an internally tapered portion for engaging the tapered outer surface of the contractible means, and said first end of the socket member having means for drawing the socket member toward the body member, the arrangement being such as to confine the contractible means between the socket member and the reaction ring and to cause the contractible means to contract about the hose.

While the invention is not limited thereto, it is especially suited for embodiment in fittings intended for use on hose having a tubular core or lining formed from a substantially inelastic plastic such as polytetrafluoroethylene which is reinforced with an armor or sheath layer or braided steel wires or the like.

The invention will be better understood after reading the following description of a presently preferred embodiment thereof with reference to the appended drawings in which:

FIGURE 1 is an elevational view partly in section showing an end fitting in accordance with the invention as it would appear when fully assembled on the end of a length of hose;

FIGURE 2 is a transverse sectional view taken along line 2—2 in FIGURE 1;

FIGURE 5 is a longitudinal sectional view of the hose assembly of FIGURE 1 at a preliminary stage in the assembly procedure;

FIGURE 6 is a view similar to FIGURE 5 showing the parts at a later stage in the assembly; and FIGURE 7 is a view of the wedges, which form a part of the contractible means, as they appear in fully expanded condition and as they appear in the stock from which they are machined in accordance with one method of fabrication.

Figure 3:
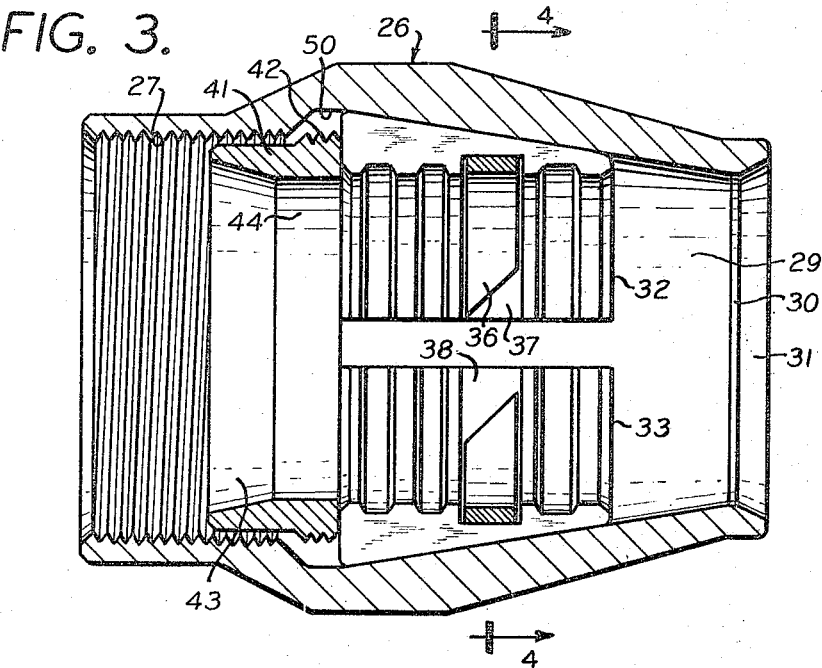
FIGURE 3 is a longitudinal sectional view through the socket sub-assembly of the fitting illustrated in FIGURE 1 and showing the contractible means in fully expanded condition.

Referring now to the drawings, the same reference numerals are used throughout to designate the same parts. The end fitting of the invention is shown in various stages of assembly on the end of a hose 10 having a fluid tight non-metallic interior layer 11 of sintered extruded polytetrafluoroethylene surrounded by a reinforcing wire layer 12. The layer 12 may consist of one or more layers of wire either spirally wrapped or braided or both. In general, the outer layer will be braided. If desired, chafe guard layers of resilient plastic may be interposed between adjacent wire layers.

A tubular nipple 13 has one end including the annular grooves 14, the enlarged portion 15, and the stepped area 16 for insertion, as shown, within the liner 11 of the hose. The nipple is inserted until the end of the liner engages the flange 17. The nipple has an opposite end portion 18 which is externally threaded and extends, as shown, from the hose.

A body member 19 in the form of a sleeve has one end 20 for telescoping over the end portion 18 of the nipple and over the end of the hose interior layer 11 but under the end of the reinforcing layer 12. This last is best seen in FIGURE 5. The body member 19 is counterbored to provide the internal shoulder 21 and the stepped area 22 which complements the stepped area of the nipple. Internal threads 23 are provided for securing the member 19 to the end portion 18 of the nipple. The hose can be squeezed in a vise or the like to obtain a grip on the nipple, whereupon the body member 19 is threadedly engaged with the nipple until the latter engages the shoulder 21.

A swivel nut 24 is shown attached to the opposite end of the body member 19 by means of a staking wire 25 or the like to provide a coupling means therefor.

As shown, the end 20 of the member 19 is externally tapered so as to expand the end of the reinforcing layer 12.

The nipple 13 and body member 19 are described in further detail in the copending application of Irvin D. Press, Serial No. 133,415, filed August 23, 1961, abandoned in favor of continuing application Serial No. 433,847, now Patent No. 3,237,974, and assigned to the same assignee as the present application. As explained therein the complemental stepped portions or areas of the nipple and body member function to establish axially spaced zones of high compression or squeeze on the interior layer of the hose. This arrangement provides an extremely efficient fluid seal which functions equally well in the presence of low positive pressure, high vacuum pressure, and very high positive pressure.

The end fitting embodying the present invention differs from the prior fitting referred to above in the construction of the socket 26 and the component parts pre-assembled with respect thereto to form the sub-assembly illustrated in FIGURE 3.

The socket 26 has a first end which is threaded internally at 27 for telescoping and threaded engagement with the external threads 28 on the body member 19. The opposite end of the socket is provided with an internally tapered or conical surface 29 terminating in a short cylindrical surface 30 and a bell mouth 31.

A series of four wedges, 32, 33, 34 and 35, are held within the tapered portion of socket 26 in contact with the surface 29 by means of a split ring spring 36 positioned in grooves 37, 38, 39 and 40. The spring 36 is split by a scarf cut in order to minimize the tip-to-tip gap while permitting necessary contraction for reasons which will appear hereinafter.

A reaction ring 41 is also disposed within the socket between the wedges and the socket threads 27. Ring 41 is threaded externally over a portion of its length at 42 for threaded engagement with the threads 27 during factory assembly of the socket sub-assembly. The remainder of the ring has a reduced diameter less than the crest diameter of the threads 27 such that the ring 41 can occupy the position shown in FIGURE 3 prior to assembly of the fitting.

The internal surface of the ring is made up of a conical or tapered portion 43 and a cylindrical portion 44. The diameter of the cylindrical portion 44 is preferably the same as or fractionally smaller than the diameter of the surface 30 of the socket, and both surfaces 30 and 44 are slightly larger than the free outside diameter of the hose 10 such that the sub-assembly can slide freely along the body of the hose.

Figure 4:
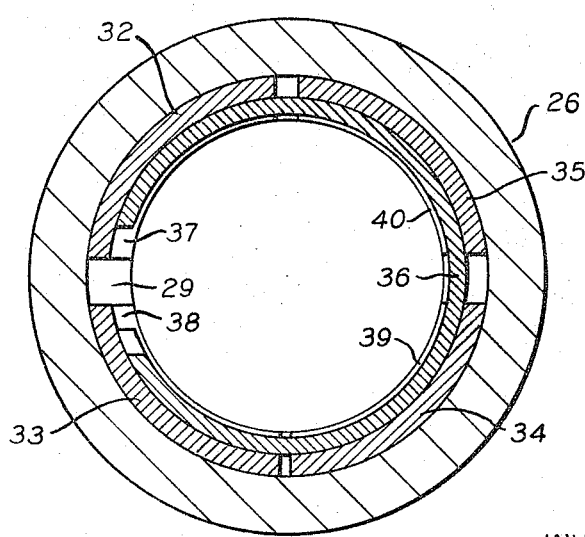
FIGURE 4 is a transverse sectional view taken along line 4—4 in FIGURE 3.

The presently preferred technique for constructing the wedges can best be explained with reference to FIGURE 7. A section of bar stock is first machined to provide a conical outer surface 45 and a grooved internal surface (best seen in FIGURE 3). Then the workpiece is quartered by cutting longitudinally. This gives rise to the kerfs 46, 47, 48 and 49. The dimensions of the tapered outer surface 45 are selected preferably such that the surface coincides with the surface 29 of the socket 26 when the wedges are in fully expanded condition. This condition is represented in FIGURES 3, 4 and 7. As best seen in FIG. 3, the socket 26 may be provided with a cylindrical region 50 intersecting the tapered portion 29. The base of each wedge coincides with the point of intersection between surfaces 29 and 50 when the wedges are in fully expanded condition. Sufficient clearance should be provided so that the reaction ring 41 can remain free of the threads 27. The wedges need not be uniformly spaced and are shown in typical relationship in FIGURE 4.

The radius R in FIGURE 7 is chosen so that the diameter of the opening through the wedges when in expanded condition is slightly larger, e.g., .005 inch, than the diameter of surface 44. During assembly of the fitting on the end of a length of hose the socket subassembly is first slipped over the end of the hose to a position such as in FIGURE 5. The bell mouth 31 and cylindrical portion 30 of socket 26 function to guide the splayed ends of the wire reinforcement into the socket and through the wedges.

After the socket sub-assembly has been threaded onto the hose, the nipple 13 and body member 19 are installed as shown in FIGURE 5. Then the socket sub-assembly is brought back towards the end of the hose. It is important during this phase of the installation that the wedges do not snag on the outer surface of the hose. It is for this reason that the radius R (see FIGURE 7) is chosen as described.

As the socket sub-assembly is brought toward the end of the hose the parts will attain the relative positions shown in FIGURE 6 with the conical surface 43 of the reaction ring 41 just engaging the expanded end of the hose reinforcing layer 12. The tapered inner surface 43 of the reaction ring is complemental to the tapered portion of the end 20 of the body member and is dimensioned relative to the thickness of the reinforcing layer 12 and the dimensions of the tapered portion of member 19 so as to clamp the end of layer 12 to the member 19 upon urging ring 41 toward member 19. At this stage in the assembly clearance still is present between the hose and the wedges. Hence although further axial movement of the reaction ring 41 will be restricted, the wedges 32 to 35 are free to ride down the slope of the conical surface 29 in the socket for a short distance restrained only by the resistance of the spring 36. The arrangement is such that the threads 27 on the socket effectively engage the threads 28 on the body member 19 before the clearance between the hose and the wedges is eliminated. This much of the assembly can be performed by hand without the aid of tools.

With the threads 27 and 28 engaged and with the body member 19 immobilized by securing the wrench flats 51 in a wrench or vise, the socket 26 is rotated with the aid of its flats 52. Further axial movement of the reaction ring will be limited to the amount of squeeze or compression that can be developed on the end of the reinforcing layer 12 of the hose. The wedges will continue to travel down the tapered surface in the socket, contracting about the hose and compressing the hose against the nipple until the fully assembled condition as shown in FIGURES 1 and 2 is attained. This position is signalled by the end 53 of the socket 26 encountering the side wall of the wrench flats 51.

The reactive force to urge the wedges down the socket taper is developed by engagement with the reaction ring 41. However, the reaction ring does not offer any resistance to axial movement prior to clamping the hose layer 12 against the end 20 of the member 19.

Bearing in mind that the outer surface 45 of the wedges is initially conical with the wedges spaced apart as shown in FIGURE 7, it follows that the intersection of the surface 45 and a transverse plane will no longer coincide with a circle as the wedges converge toward the axis of the fitting. This out-of-round condition is best seen in FIGURE 2 wherein the wedges are shown contacting the socket only along their longitudinal marginal edges.

It will also be observed from FIGURE 2 that the gaps between the wedges, although appreciably reduced, have not been eliminated altogether. This provides for an additional factor of safety. That is, it has been found through tests that the socket may be unscrewed deliberately several turns without causing failure of the assembly. Apparently the wedges become locked to the hose reinforcement so that as the hose starts to blow off, the wedges are merely pulled back toward the bell mouth end of the socket renewing the tight grip on the hose.

The spring 36, unlike the wedges, reduces its diameter by uniform flexing and so maintains a round configuration. This also appears in FIGURE 2.

It may also be observed from FIGURE 2 that the wedges do not develop uniform pressure around the hose circumference. Maximum pressure is developed along the middle of the wedge. However, the pressure developed by the wedges is intended primarily to secure the fitting to the hose and is not required for fluid sealing, the latter being accomplished in the complemental step area of the fitting. The non-circular final assembled condition of the wedges does not appear to have any adverse effect upon the gripping force obtained. In fact, there is a tendency for the parts to assume a "square" rather than circular configuration which resists inadvertent loosening.

The parts should be proportioned, preferably as shown, to relieve the pressure immediately over the thin end of the member 19 so as to avoid excessive if not all swaging of such end. Actual tests have demonstrated that a fitting may be disassembled and reassembled any number of times without failure of the assembly or of component parts.

Referring once again to the scarf cut in the spring 36 it enables the ring to have sufficient tolerance for contraction that the ends do not meet throughout the entire range of anticipated operation. At the same time, the gap in the open position as seen in FIGURES 3 and 4 must not be such as to permit a wedge to cock and fall out or bind.

It has been found that a taper angle of between 9° and 12° for the surfaces 29 and 45 gives satisfactory results.

While it is presently preferred to construct the wedges such that the outer surfaces are congruent with the surface 29 in the socket when the wedges are in expanded position it may be preferred that congruence occur with the wedges in contracted condition, or in some intermediate relationship.

The invention has been described with reference to a presently preferred embodiment thereof. It will appear undoubtedly to those skilled in the art that numerous changes may be made without departing from the true spirit of the invention as defined in the appended claims.

What is claimed is:

1. A reusable end fitting for a hose whose wall is divisible into a fluid tight non-metallic interior layer surrounded by a reinforcing layer, said fitting comprising:
   a tubular nipple for insertion within the interior layer of said hose adjacent an end thereof;
   a tubular body member carrying at one end coupling means and having at its other end an annular portion for radially expanding the end of said reinforcing layer adjacent said end of the hose;
   a reaction ring for surrounding said end of the reinforcing layer for clamping it to said portion of the body member upon urging of the reaction ring toward said body member;
   a plurality of circumferentially distributed wedges for surrounding said reinforcing layer at a point beyond both said reaction ring and the end of said body member but overlying said nipple, each wedge having a conical outer surface;
   and a socket member for surrounding both said wedges and said reaction ring and having an internally tapered portion of greater axial length than the axial length of said wedges for engaging the conical outer surfaces of said wedges, said wedges being provided with spring means for urging the wedges radially outwardly into contact with the wall of the tapered portion of said socket member, said socket member and said body member being provided with means for cooperatively drawing said socket member toward said body member, the arrangement being such as to confine said wedges between the tapered portion of said socket member and said reaction ring and to cause, upon drawing said socket member toward said body member, said reaction ring to be urged by contact with said wedges toward said body member until its movement is resisted whereupon said wedges are caused to move toward the smaller end of the tapered portion of said socket member and to contract about said hose, the total circumferential extent of said wedges when in edge to edge abutting relationship being such as to permit them to occupy the space adjacent the reduced diameter end of the tapered portion of the socket member, means being provided for retaining said reaction ring and said wedges within the tapered portion of said socket member irrespective of assembly with said nipple and said body member.

2. A reusable end fitting according to claim 1, wherein the means for retaining the reaction ring and wedges within the tapered portion of the socket member comprises external threads on the reaction ring for cooperation with internal threads on the socket member, said internal threads being part of the means for cooperatively drawing the socket member toward the body member.

3. A reusable end fitting according to claim 1, wherein means are provided for limiting at a predetermined fully assembled position the extent to which said socket member can be drawn toward said body member and for signalling when said predetermined position is reached.

4. A reuseable end fitting according to claim 1, wherein the conicity of the outer surfaces of the wedges is related to the conicity of the tapered portion of said socket member such that said wedges make broad surface contact with the tapered portion of said socket member when they are in expanded position and the wedges make line contact along their longitudinal edges with the surface of the socket member when they are in contracted position.

References Cited by the Examiner

UNITED STATES PATENTS

| | | | |
|---|---|---|---|
| 2,428,189 | 9/1947 | Wolfram | 285—249 X |
| 2,470,538 | 5/1949 | Wolfram et al. | 285—249 X |
| 2,544,712 | 3/1951 | Miller | 285—249 X |
| 3,008,736 | 11/1961 | Samiran | 285—149 |
| 3,097,866 | 7/1963 | Iversen | 285—322 X |
| 3,118,691 | 1/1964 | Press | 285—149 |
| 3,184,706 | 5/1965 | Atkins | 285—149 X |
| 3,191,975 | 6/1965 | La Marre et al. | 285—243 |

CARL W. TOMLIN, *Primary Examiner.*

THOMAS F. CALLAGHAN, *Examiner.*